United States Patent
Chiang et al.

(10) Patent No.: US 8,826,435 B1
(45) Date of Patent: Sep. 2, 2014

(54) APPARATUS AND METHODS FOR PROTECTING REMOVABLE STORAGE DEVICES FROM MALWARE INFECTION

(75) Inventors: Wei Chiang, Taipei (TW); Tzu-Hsiao Weng, Taipei (TW); Chih-Kuan Chien, Taipei (TW); Jian-Chang Cheng, Taipei (TW); Yih-Shiou Jiang, Taipei (TW); Wan-Pao Ko, Taipei (TW); Robert Chen, Taipei (TW); Yun-Hsien Liu, Taipei (TW); Tsung-Kang Liu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 808 days.

(21) Appl. No.: 12/721,232

(22) Filed: Mar. 10, 2010

Related U.S. Application Data

(60) Provisional application No. 61/182,047, filed on May 28, 2009.

(51) Int. Cl.
*G06F 21/00* (2013.01)

(52) U.S. Cl.
USPC .............................................. 726/24; 713/193

(58) Field of Classification Search
USPC .................................. 726/24; 713/193, 93, 1
See application file for complete search history.

(56) References Cited

U.S. PATENT DOCUMENTS

| | | | |
|---|---|---|---|
| 6,330,648 B1 * | 12/2001 | Wambach et al. | 711/163 |
| 7,975,304 B2 * | 7/2011 | Lu | 726/24 |
| 2003/0154385 A1 * | 8/2003 | Liu | 713/193 |
| 2006/0168653 A1 | 7/2006 | Contrera | |
| 2007/0283444 A1 * | 12/2007 | Jang | 726/26 |
| 2008/0052507 A1 | 2/2008 | Chow et al. | |
| 2008/0052744 A1 * | 2/2008 | Hamasaka | 725/58 |
| 2008/0177994 A1 * | 7/2008 | Mayer | 713/2 |
| 2009/0055896 A1 | 2/2009 | Aoki et al. | |
| 2009/0106516 A1 * | 4/2009 | Chen et al. | 711/163 |
| 2009/0113128 A1 * | 4/2009 | Zhao | 711/115 |
| 2010/0161878 A1 * | 6/2010 | Chang | 711/103 |
| 2011/0225654 A1 * | 9/2011 | Weng et al. | 726/24 |

* cited by examiner

*Primary Examiner* — Carl Colin
*Assistant Examiner* — Ali Shayanfar
(74) *Attorney, Agent, or Firm* — Okamoto & Benedicto LLP

(57) ABSTRACT

One embodiment relates to a computer-implemented method for protecting a removable storage device from malware on a computer apparatus. An indication is received that the removable storage device has been connected to the computer apparatus, wherein the removable storage device is partitioned into a CD-ROM partition and a user partition. An anti-virus module stored in the CD-ROM partition on the removable storage device is automatically executed upon connecting the removable storage device to a computer apparatus. Other embodiments, aspects and features may also be disclosed.

2 Claims, 2 Drawing Sheets

APPARATUS AND METHODS FOR PROTECTING REMOVABLE STORAGE DEVICES FROM MALWARE INFECTION

CROSS-REFERENCE TO RELATED APPLICATION

This application claims the benefit of U.S. Provisional Application No. 61/182,047, filed on May 28, 2009, which is incorporated herein by reference in its entirety.

BACKGROUND

1. Technical Field

The present invention relates generally to computer security, and more particularly, but not exclusively, to methods and apparatus for protecting removable storage devices from malware infection.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to as malware or "viruses." Malware scanning or "antivirus" products for protecting computers against malicious codes are commercially available. Experienced computer users have installed some form of antivirus in their computers.

Unfortunately, if a host computer is already infected by a computer virus or other malware, then a removable USB (Universal Serial Bus) storage device which is connected to the host computer is vulnerable to infection by the malware. This vulnerability is present even if the removable USB storage device has anti-virus (AV) software on it. This is because, before the AV software is executed, the USB device is already available and susceptible to an attack or infection by a computer virus or other malware on the host computer.

SUMMARY

One embodiment relates to a computer-implemented method for protecting a removable storage device from malware on a computer apparatus. An indication is received that the removable storage device has been connected to the computer apparatus, wherein the removable storage device is partitioned into a CD-ROM partition and a user partition. An anti-virus module stored in the CD-ROM partition on the removable storage device is automatically executed upon connecting the removable storage device to a computer apparatus.

Another embodiment relates to a removable storage device which is configured to be connected to a computer apparatus. The device includes data storage configured to store computer-readable code and data, and an interface configured to be removably connected to the computer apparatus for accessing the data storage. The data storage is partitioned into a CD-ROM partition and a user partition. Computer-readable code stored in CD-ROM partition is configured to provide anti-virus protection against malware on the computer apparatus.

Other embodiments, aspects and features may also be disclosed.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

Example Computer Apparatus and Network System

Figure 1:
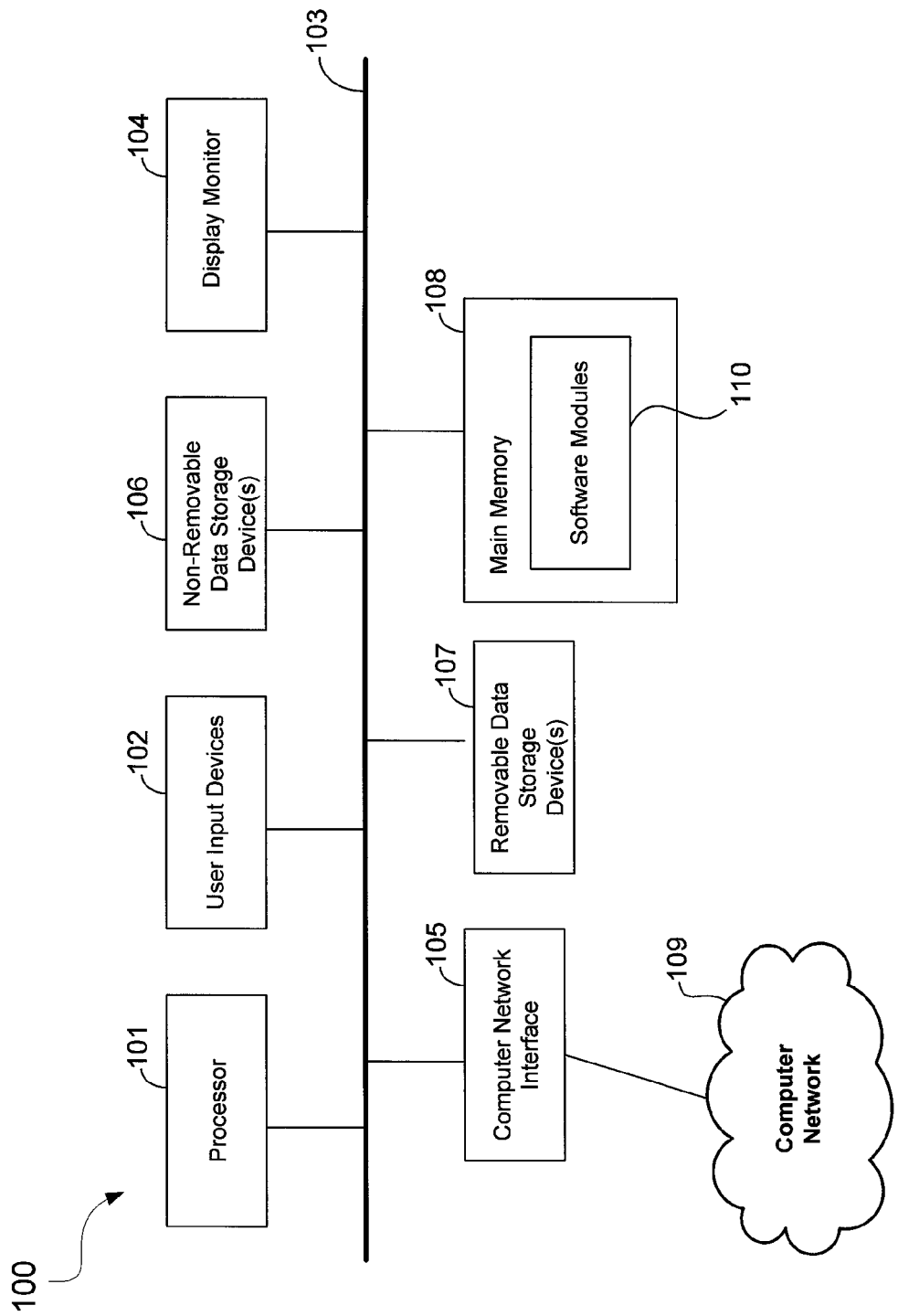
FIG. 1 shows a schematic diagram of a computer apparatus in accordance with an embodiment of the invention.

Referring now to FIG. 1, there is shown a schematic diagram of a computer apparatus 100 in accordance with an embodiment of the present invention. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), a display monitor 104 (e.g., LCD, flat panel monitor, CRT), a computer network interface 105 (e.g., network adapter, modem), one or more non-removable data storage devices 106 (for example, one or more hard drives), one or more removable storage devices 107 (for example, a removable USB storage device), and a main memory 108 (e.g., RAM). The computer network interface 105 may be coupled to a computer network 109, which in this example includes the Internet.

In the example of FIG. 1, the main memory 108 may be loaded with one or more software modules 110. The software modules 110 may comprise various computer-readable program code components. The software modules 110 may be loaded from a data storage device to the main memory 108 for execution by the processor 101.

Figure 2:
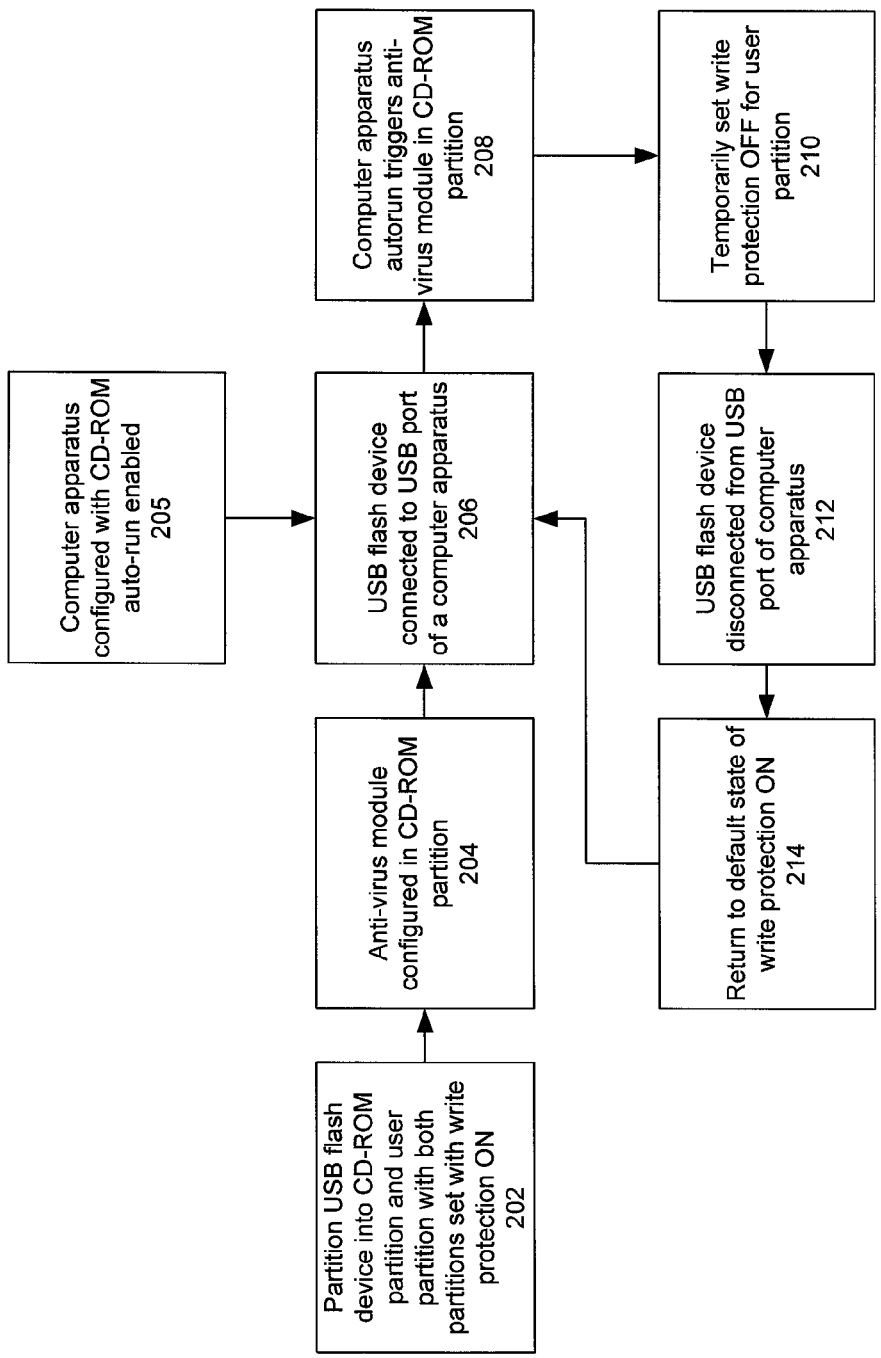
FIG. 2 is a flow chart depicting a computer-implemented method for protecting a USB device from malware infection in accordance with an embodiment of the invention.

FIG. 2 is a flow chart depicting a computer-implemented method 200 for protecting a USB device from malware infection in accordance with an embodiment of the invention. The computer-implemented method 200 may be implemented, at least in part, using software modules 110 having computer-readable code which is configured to be executed by a processor 101 so as to perform one or more steps of the method 200.

As shown, the USB flash device (or other removable storage device) is partitioned 202 into a CD-ROM partition and a user partition (removable disk) with both partitions set with write protection ON. An anti-virus (AV) module may then be configured 204 in the CD-ROM partition. These two steps (202 and 204) may be performed during a manufacturing process prior to sale of the flash device.

As further shown, a computer apparatus may be configured 205 with CD-ROM auto-run enabled. If this computer apparatus becomes infected with a computer virus or other malware, then spread of the infection to the flash device may be prevented as follows.

Consider that the USB flash device (configured with the AV module in the CD-ROM petition per above) is removably connected 206 to a USB port of the computer apparatus. The computer apparatus auto-run feature then triggers execution 208 of the AV module in the CD-ROM partition. The AV module protects the USB flash device from becoming infected by a computer virus or other malware that may be present on the computer apparatus. With the anti-virus protection in place, the write protection may be temporarily set 210 to be OFF for the user partition of the removable storage device. This allows the user partition to be written in a manner which avoids infection by malware that may be present on the computer apparatus.

Thereafter, if the USB storage device is unplug or disconnected 212 from the USB port of the computer apparatus, then the removable storage device is returned 214 to a default state where the write protection of the user partition is back ON. If the USB storage device is re-connected 206 to computer apparatus, then the auto-run feature again triggers execution 208 of the AV module in the CD-ROM partition and so forth as described above.

CONCLUSION

While specific embodiments of the present invention have been provided, it is to be understood that these embodiments are for illustration purposes and not limiting. Many additional embodiments will be apparent to persons of ordinary skill in the art reading this disclosure.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

What is claimed is:

1. A computer-implemented method for protecting a removable storage device from malware on a computer apparatus, the method comprising:
    receiving an indication that the removable storage device has been connected to the computer apparatus, wherein the removable storage device is partitioned into a CD-ROM partition and a user partition;
    automatically executing an anti-virus module stored in the CD-ROM partition on the removable storage device upon connecting the removable storage device to a computer apparatus;
    once anti-virus protection is in place, temporarily setting a write protection to an off state for the user partition on the removable storage device;
    when the removable storage device is disconnected from the computer apparatus, then returning the write protection for the user partition to a default state where the write protection is in an on state; and
    when the removable storage device is re-connected to the computer apparatus, then repeating the method.

2. A computer apparatus comprising:
    removable data storage configured to store computer-readable code and data;
    an interface configured to be removably connected to the computer apparatus for accessing the removable data storage;
    a CD-ROM partition in the removable data storage;
    a user partition in the data storage; and
    computer-readable code stored in CD-ROM partition and configured to provide anti-virus protection against malware on the computer apparatus, wherein the computer-readable code is further configured to
        once anti-virus protection is in place, temporarily set a write protection OFF for the user partition in the removable data storage,
        when the removable data storage is disconnected from the computer apparatus, then return the write protection for the user partition to a default state where the write protection is in an ON state, and
        when the removable data storage is re-connected to the computer apparatus, then repeating the method.

* * * * *